United States Patent
Sakamaki

(10) Patent No.: US 11,089,185 B2
(45) Date of Patent: Aug. 10, 2021

(54) CLEANING APPARATUS

(71) Applicant: CANON KABUSHIKI KAISHA, Tokyo (JP)

(72) Inventor: Akihiko Sakamaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/570,900

(22) Filed: Sep. 13, 2019

(65) Prior Publication Data

US 2020/0099827 A1   Mar. 26, 2020

(30) Foreign Application Priority Data

Sep. 20, 2018 (JP) .............................. JP2018-176520

(51) Int. Cl.
    *H04N 5/217* (2011.01)
    *B08B 1/00* (2006.01)
(52) U.S. Cl.
    CPC ........... *H04N 5/2171* (2013.01); *B08B 1/006* (2013.01)
(58) Field of Classification Search
    CPC .......................... H04N 5/2171; H04N 5/2252
    USPC .................................................... 348/207.99
    See application file for complete search history.

(56) References Cited

U.S. PATENT DOCUMENTS

| 6,128,461 | A  | * | 10/2000 | Yoshikawa | ........ G03G 21/0029 |
|   |   |   |   |   | 399/350 |
| 2015/0198875 | A1 | * | 7/2015 | Pan | ........ H01L 21/027 |
|   |   |   |   |   | 15/303 |
| 2015/0334277 | A1 | * | 11/2015 | Liu | ........ H04N 5/2257 |
|   |   |   |   |   | 348/374 |
| 2016/0250997 | A1 | * | 9/2016 | Toda | ........ B60S 1/0807 |
|   |   |   |   |   | 701/49 |
| 2019/0181022 | A1 | * | 6/2019 | Mouri | ........ B24B 37/107 |

FOREIGN PATENT DOCUMENTS

JP          4537105 B2    9/2010

* cited by examiner

*Primary Examiner* — Anthony J Daniels
(74) *Attorney, Agent, or Firm* — Canon U.S.A., Inc. I.P. Division

(57) ABSTRACT

A cleaning apparatus for cleaning a detection device having a detection surface includes a cleaning unit provided with a cleaning member for performing a cleaning and configured to perform a wipe-off cleaning in a state where the cleaning member is in contact with the detection surface, a drive unit configured to press the cleaning member onto the detection surface, a detection unit configured to detect a force with which the cleaning member presses the detection surface, and a control unit configured to, while controlling the drive unit based on a result of the force detection by the detection unit to control the force, drive the cleaning unit to perform the wipe-off cleaning.

7 Claims, 12 Drawing Sheets

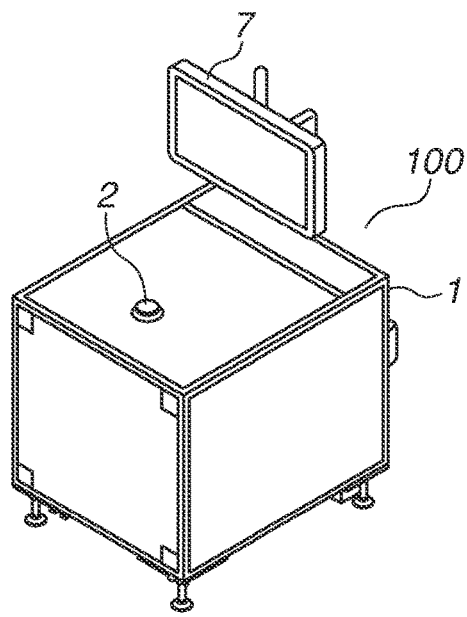
FIG.1A
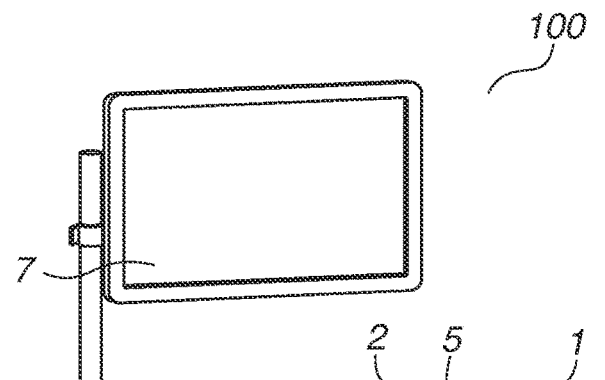
FIG.1B
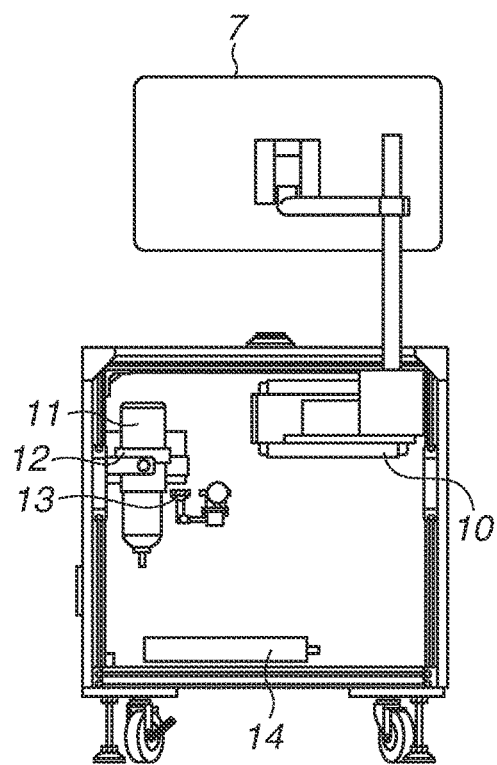
FIG.1C
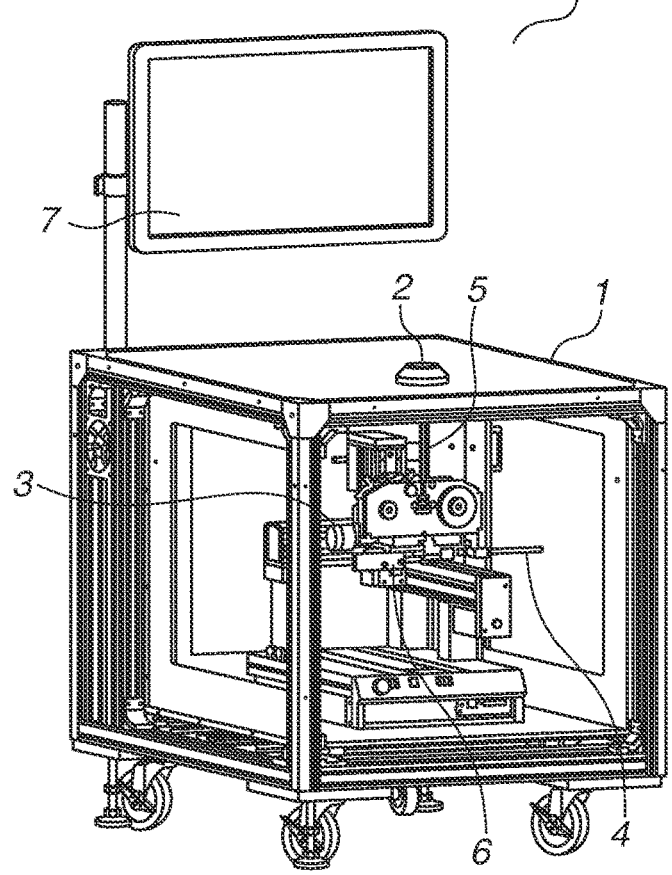

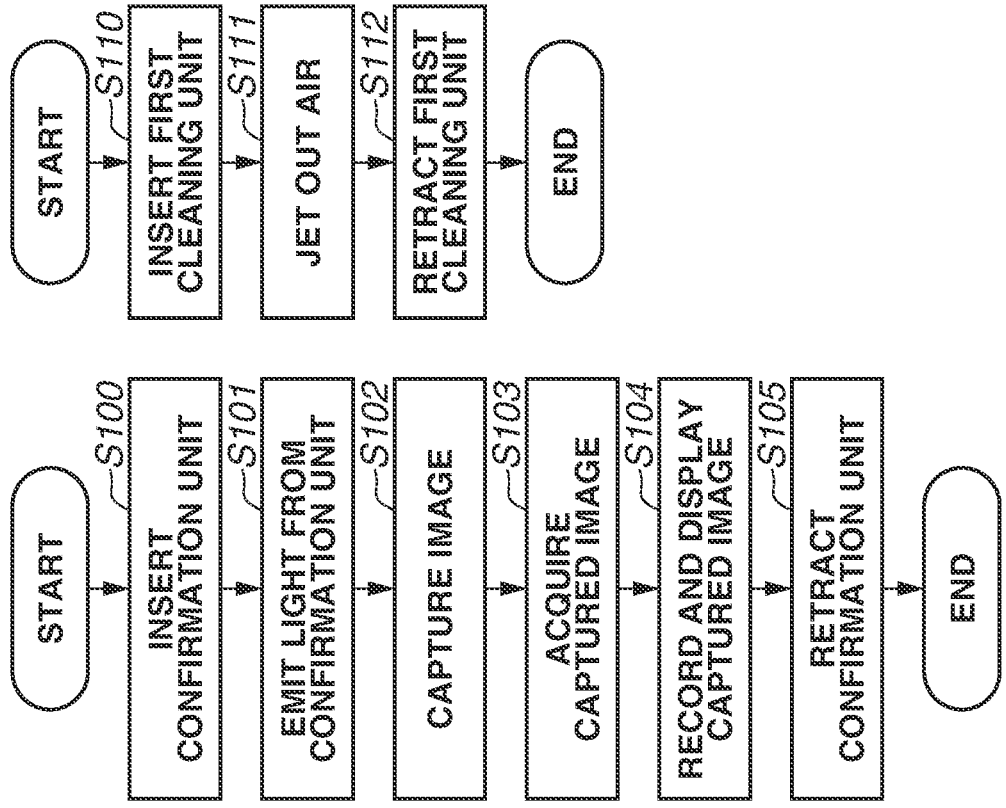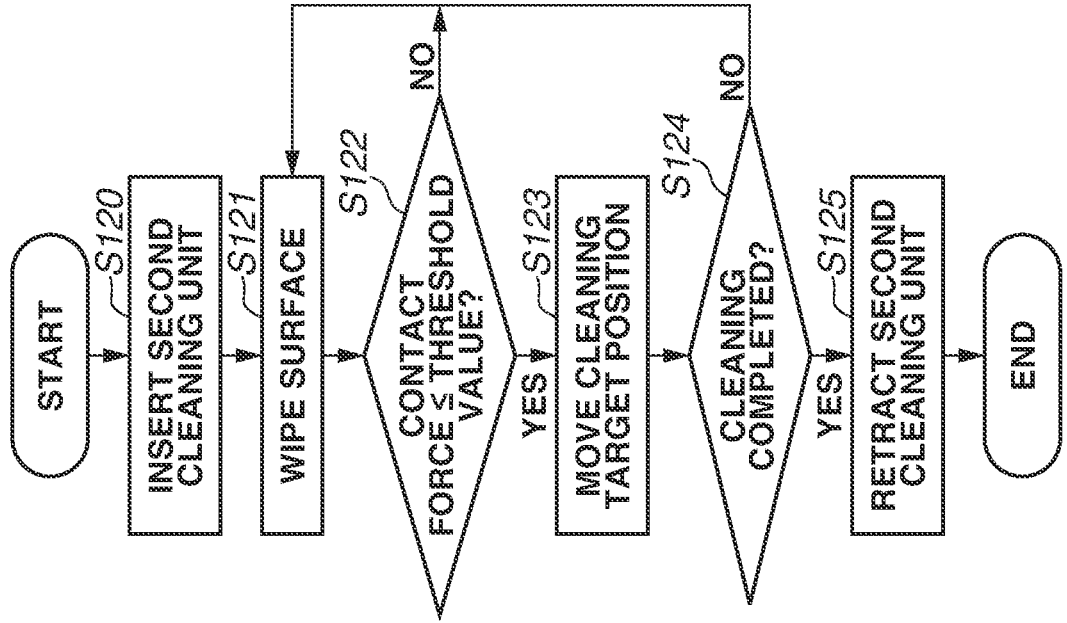

FIG.11A
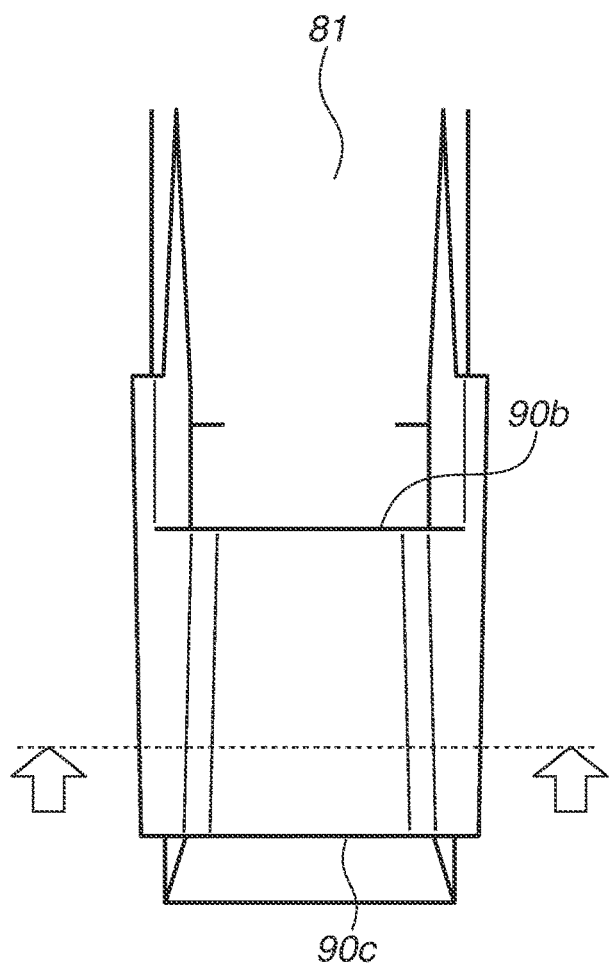
FIG.11B
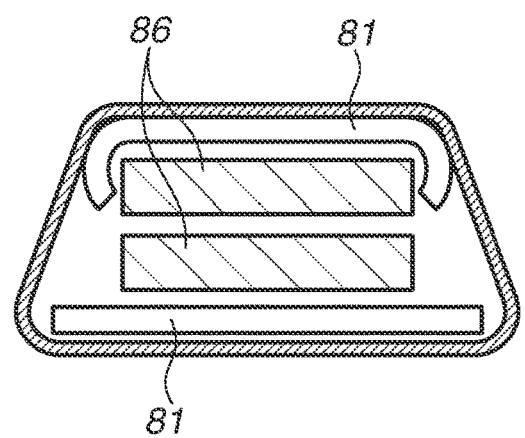
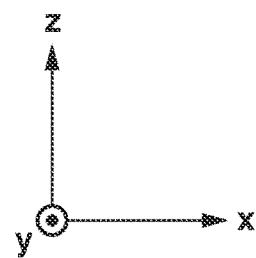
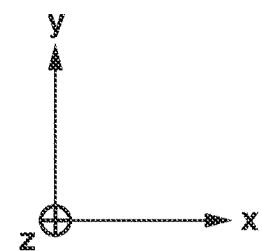

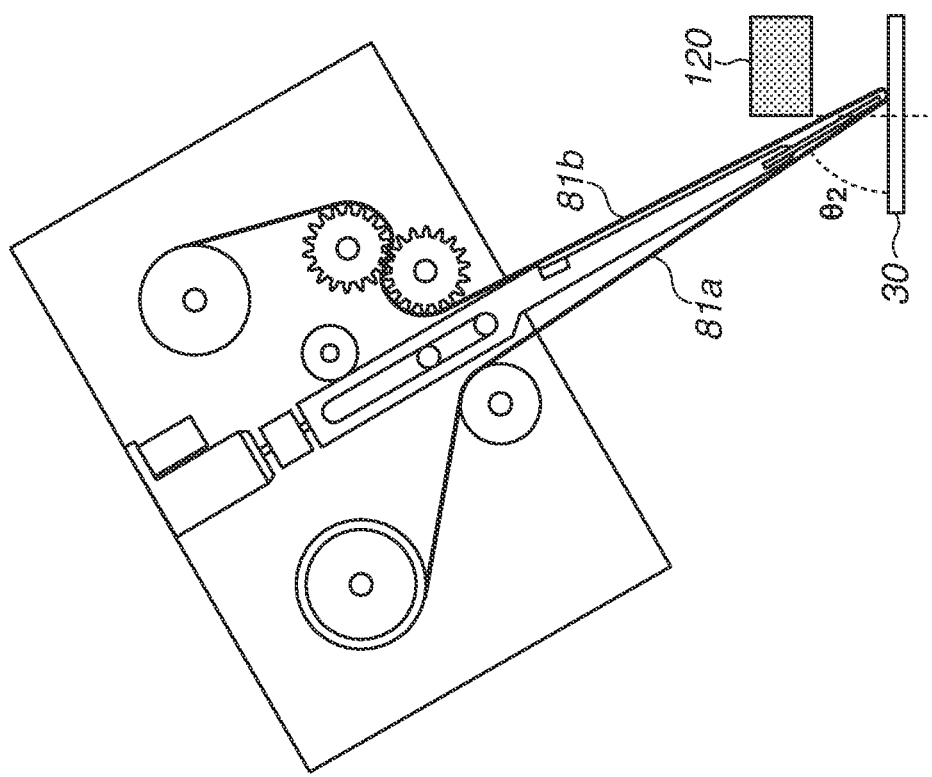
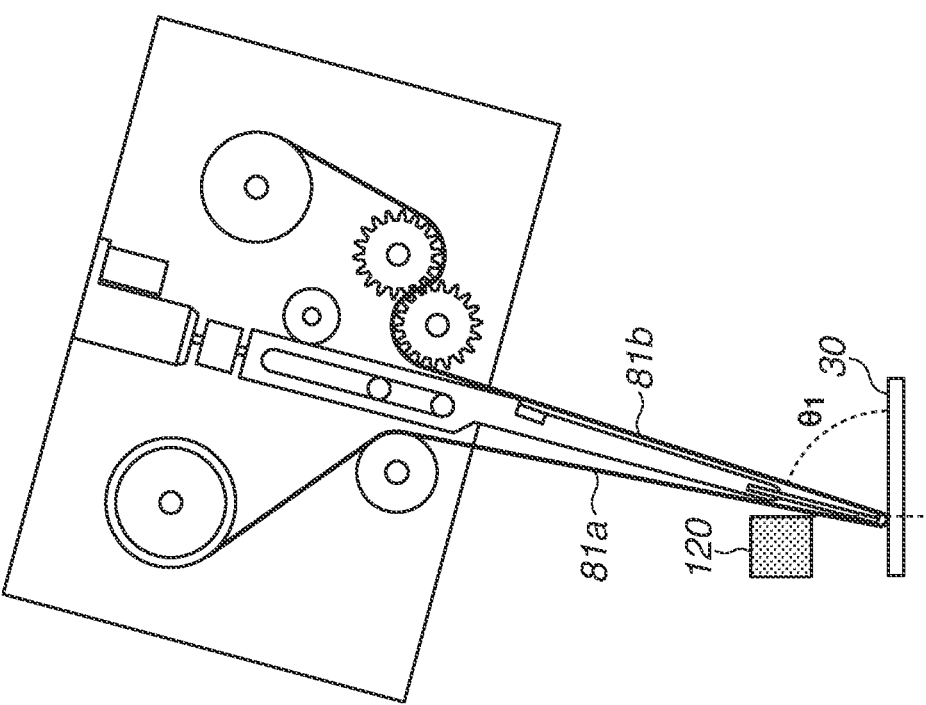

CLEANING APPARATUS

BACKGROUND OF THE INVENTION

Field of the Invention

The present disclosure relates to a cleaning apparatus for cleaning a detection surface of a detection device for detecting a physical quantity, such as light and electromagnetic waves. The present disclosure also relates to a method for controlling the cleaning apparatus.

Description of the Related Art

In detection devices for detecting light and electromagnetic waves, there have been instances where dust adhering to the detection surface causes erroneous detection. For example, in a digital camera having an image sensor composed of an array of photoelectric converters (light receiving elements), periodical cleaning of the imaging plane of the image sensor prevents the degradation of the image quality of a captured image. However, since a user who cleans the imaging plane may accidentally damage it, it has been common to contact manufacturer's service store to request for cleaning by a specialist worker. However, even if cleaning is performed by a specialist worker, the working accuracy in cleaning varies because of difference in proficiency. Japanese Patent No. 04537105 discusses a cleaning apparatus for cleaning the surface of the imaging plane by using air pressure or by performing a wipe-off cleaning with an adhesive sheet. The cleaning apparatus is used in a connection state to a camera.

SUMMARY OF THE INVENTION

According to an aspect of the present disclosure, a cleaning apparatus for cleaning a detection device having a detection surface includes a wipe-off cleaning unit configured to perform a wipe-off cleaning on the detection surface while in contact with the detection surface, and a conduction member configured to electrically connect with the wipe-off cleaning unit to become equipotential to the wipe-off cleaning unit. When the wipe-off cleaning unit and the conduction member are electrically connected, the detection surface and the wipe-off cleaning unit become equipotential.

According to another aspect of the present disclosure, a cleaning apparatus that cleans a detection device having a detection surface includes a cleaning unit provided with a cleaning member for performing a cleaning and configured to perform a wipe-off cleaning in a state where the cleaning member is in contact with the detection surface, a drive unit configured to press the cleaning member onto the detection surface, a detection unit configured to detect a force with which the cleaning member presses the detection surface, and a control unit configured to, while controlling the drive unit based on a result of the force detection by the detection unit to control the force, drive the cleaning unit to perform the wipe-off cleaning.

Further features of the present disclosure will become apparent from the following description of exemplary embodiments with reference to the attached drawings.

BRIEF DESCRIPTION OF THE DRAWINGS

FIGS. 1A, 1B, and 1C are perspective views illustrating a cleaning apparatus according to an exemplary embodiment.

FIGS. 4A, 4B, and 4C are flowcharts illustrating each sequence of the cleaning apparatus according to the exemplary embodiment.

FIGS. 11A and 11B are bird's-eye views illustrating the configuration of the tip portion of the second cleaning unit according to the exemplary embodiment.

FIGS. 12A and 12B are side views illustrating contact angles when the second cleaning unit cleans an image sensor surface according to the exemplary embodiment.

DESCRIPTION OF THE EMBODIMENTS

Figure 2:
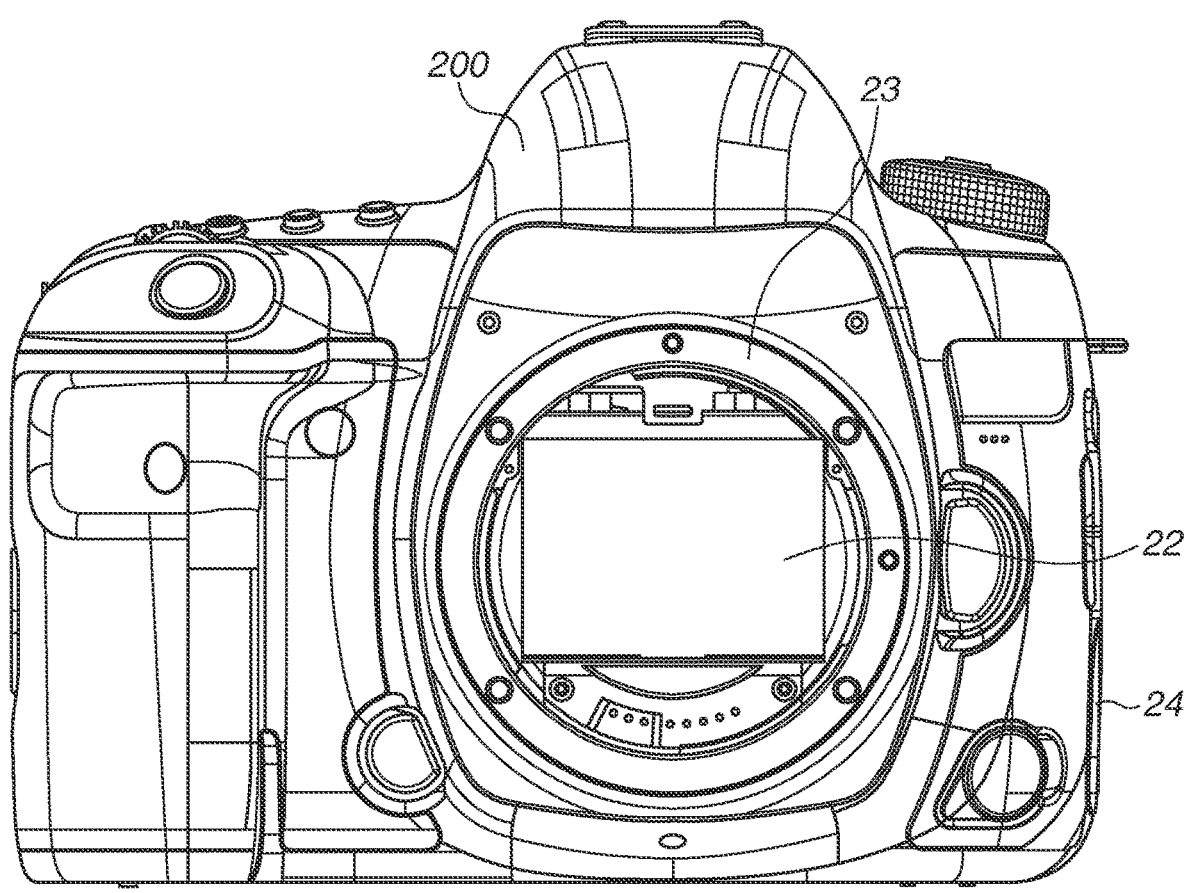
FIG. 2 is a front view illustrating an imaging apparatus according to the exemplary embodiment.

An exemplary embodiment of the present disclosure will be described in detail below with reference to the accompanying drawings. In the drawings, identical elements are assigned the same reference numerals.

Japanese Patent No. 04537105 does not satisfactorily discuss a method for controlling a cleaning apparatus to remove dusts on the detection surface. A problem of removing dust adhering to the detection surface is not limited to an image sensor but is common to all types of detection devices having a detection surface for detecting a physical quantity. A cleaning apparatus is similarly required for all types of detection devices.

The present disclosure is directed to a cleaning apparatus for suitably removing dust adhering to the detection surface of a detection device having a detection surface.

FIGS. 1A to 1C illustrate a cleaning apparatus 100 as an example of a cleaning apparatus according to the present exemplary embodiment. The present exemplary embodiment will be described below centering on an example of a cleaning apparatus for cleaning an imaging plane of an image sensor composed of a complementary metal oxide semiconductor (CMOS) sensor included in a digital camera.

FIG. 1A illustrates an outer appearance of the cleaning apparatus 100. The cleaning apparatus 100 includes a main body 1 made of a metal chassis, a fixing unit 2 for fixing a detection apparatus (camera according to the present exemplary embodiment) to be cleaned, and a display unit 7 for displaying various information. The display unit 7 may be configured as a separate unit for communicating with the cleaning apparatus.

FIG. 1B illustrates an internal configuration of the cleaning apparatus 100. A movable base 6 is integrally provided with a confirmation unit 3, a first cleaning unit 4, and a second cleaning unit 5. The movable base 6 can be three-dimensionally translated and rotated to enable suitably changing the positions of these units. In particular, the movable base 6 is provided with a translation mechanism for performing the vertical translation to enable each unit to approach and retract from the position of the fixing unit 2, i.e., the surface (detection surface) of the image sensor after attaching a camera 200.

The fixing unit 2 is a ring-like metal member disposed on the external surface of the main body 1. According to the present exemplary embodiment, the fixing unit 2 is structured to enable attaching and fixing a camera mount for attaching and detaching, in normal use, an interchangeable lens to the camera 200 to be cleaned. The fixing unit 2 is provided with an electrical connection terminal for communicating with the camera 200. The fixing unit 2 is provided with a ring-like illumination unit for ensuring the light quantity when monitoring the status of cleaning by the cleaning apparatus 100. The illumination unit irradiates the detection device (image sensor of the camera 200) to be cleaned during the cleaning of the detection device by the first cleaning unit 4 and the second cleaning unit 5. The suitable shape (mechanism) of the fixing unit 2, in particular the connecting portion thereof, differs according to the type of an external apparatus to be attached. Therefore, the fixing unit 2 may be configured to be attachable to and detachable from the main body 1 and may be exchanged corresponding to an external apparatus assumed to be connected. Alternatively, there may be provided the fixing units 2 of the number necessary for all types of external apparatuses assumed to be connected. In addition, the fixing unit 2 may be provided as a general-purpose fixing mechanism for fixing all camera models.

According to the present exemplary embodiment, the cleaning apparatus 100 detects the attachment of a camera by using the connection terminal at the camera mount of the camera to be attached. More specifically, when the connection terminal of the fixing unit 2 is electrically connected with the connection terminal of the camera mount, the cleaning apparatus 100 detects that a camera is attached to the cleaning apparatus 100.

The first cleaning unit 4 is a cleaning device for performing a non-contact type cleaning on a detection device surface. According to the present exemplary embodiment, the first cleaning unit 4 ejects air to blow off dust by air pressure.

The second cleaning unit 5 is a cleaning device for performing a contact type cleaning on the detection device surface. According to the present exemplary embodiment, the second cleaning unit 5 performs a wipe-off cleaning by using a wiper to wipe off dust.

FIG. 1C illustrates a configuration of the rear face of the cleaning apparatus 100. A control unit 10 includes a computer including a central processing unit (CPU) to perform an overall operation control of the cleaning apparatus 100, processes information from each unit, and issues instructions to each unit.

An air filter 11 is a filter for reducing dust and grease in air when air to be used for the first cleaning unit 4 is injected from an external pump through an intake port 12. Air having passed through the air filter 11 is supplied to the first cleaning unit 4. If the air filter 11 is not provided, dust contained in air may possibly be blown against the detection surface of the detection device. A pressure gauge 13 measures and displays the pressure of the air injected. A user can adjust the air pressure as needed to a suitable pressure, by monitoring the pressure indicated by the pressure gauge 13.

A power source 14 supplies power to the entire cleaning apparatus 100. The cleaning apparatus 100 may have a function of supplying power to an external apparatus via an interface (the electrical connection terminal of the fixing unit 2 and a communication unit 17 according to the present exemplary embodiment).

FIG. 2 illustrates the camera 200 as an example of an apparatus having an image sensor as a detection device to be cleaned. According to the present exemplary embodiment, the camera 200 is a lens interchangeable digital single-lens reflex camera. A camera communication unit 24 performs communication in a state where the cleaning apparatus 100 is fixed to the camera 200 by a camera fixing portion 23 and therefore is electrically connected with an external apparatus. If the external apparatus is a lens, a camera control unit (not illustrated) performs the lens control and information exchange related to the lens and the camera 200. An image sensor 22 receives object light and converts the light into an electrical signal to generate digital image data. Although, in the present exemplary embodiment, a CMOS sensor is used, a Charge Coupled Device (CCD) sensor, a Charge Injection Device (CID) sensor, and other various types of sensors may be used. Further, the cleaning target of the cleaning apparatus 100 is not limited to a light receiving element, and may possibly be any types of detection devices having a function of detecting electromagnetic waves such as X-rays on the element surface thereof. The image sensor 22 has a structure in which a cover glass, an infrared radiation (IR) cut filter, a low-pass filter (LPF), and the like are stacked on a photodiode in the thickness direction. The cleaning apparatus 100 cleans the outermost surface of the image sensor 22.

A connection configuration between the cleaning apparatus 100 according to the present exemplary embodiment and the camera 200 as a detection apparatus according to the present exemplary embodiment will be described below with reference to FIGS. 1B and 2.

The camera 200 is fixed to the cleaning apparatus 100 by connecting the camera fixing portion 23 to the fixing unit 2 of the cleaning apparatus 100. The control unit 10 can control the camera 200 by communicating with the camera control unit 21 via the communication unit 17 (described below) and the camera communication unit 24. For example, the cleaning apparatus 100 determines the camera model and controlling image capturing operations such as moving the mirror and shutter of the camera 200.

Referring to FIG. 1B, the second cleaning unit 5 is directed toward the fixing unit 2. The movable base 6 has a translation mechanism for performing the vertical translation. Therefore, the second cleaning unit 5 can pass through the center of the ring of the fixing unit 2 to approach the image sensor 22 in a state where the camera 200 is physically connected.

The movable base 6 has also a rotation mechanism for rotating an attached material. The confirmation unit 3, the first cleaning unit 4, and the second cleaning unit 5 are disposed at different phase positions around the rotation axis. Like the second cleaning unit 5, this rotation mechanism can rotatably drive the front faces of the confirmation unit 3 and the first cleaning unit 4 to the position facing the fixing unit 2 (i.e., the image sensor surface of the image sensor 22).

In the cleaning sequence of each unit (described below), the rotation mechanism of the movable base 6 is also used to control the inclination (angle) of cleaning members of each unit with respect to the detection surface. More specifically, following the control of the control unit 10, the rotation mechanism controls the inclination of the nozzle when the first cleaning unit 4 jets out air to the detection surface of the image sensor 22 and controls the inclination of the wiper and the core member when the second cleaning unit 5 performs the wipe-off cleaning on the detection surface. As described above, the translation and the rotation mechanisms of the movable base 6 enable the control unit 10 to control the distance to the detection surface, for example, by directing each unit to face the fixing unit 2, and approach and retract from the fixing unit 2, i.e., the detection surface of the detection device.

The confirmation unit 3 includes an illumination unit for irradiating the cleaning target with illumination light following an instruction of the control unit 10. According to the present exemplary embodiment, a light emitting diode (LED) is provided at the tip of a cleaning member. In a state where the LED positioned close to the image sensor 22 is illuminating the element surface, the control unit 10 captures an image of the element surface (sensor surface) of the image sensor 22 to acquire an image for confirming the dust condition of the element surface. Although, in the present exemplary embodiment, the control unit 10 captures an image of the sensor surface by using the image capturing function of the image sensor 22, the present exemplary embodiment is not limited thereto. The confirmation unit 3 itself may have a sensor, such as an image sensor, to be able to acquire information for confirming the state of the detection device surface. Although, in the present exemplary embodiment, the confirmation unit 3 is attached to the movable base 6 together with the first cleaning unit 4 and the second cleaning unit 5, the confirmation unit 3 may be fixedly disposed, for example, in the vicinity of the fixing unit 2. Disposing the confirmation unit 3 in this way enables irradiation and image capturing even while each cleaning unit is performing cleaning. In addition, as the confirmation unit 3, an illumination unit and/or an image sensor may be disposed in the vicinity of cleaning members (a nozzle and a wiper at the tip of core member) of the first cleaning unit 4 and the second cleaning unit 5.

The first cleaning unit 4 is a cleaning device for performing the non-contact type cleaning on the detection device surface. According to the present exemplary embodiment, the first cleaning unit 4 jets out air from the tip (nozzle) of a cylindrical member to blow off dusts adhering to the surface of the image sensor 22 positioned near the first cleaning unit 4, by air pressure. In addition, according to the present exemplary embodiment, the first cleaning unit 4 includes an ionizer for charging air to provide a neutralization function. This aims to neutralize dust to make it easier to detach dust adhering to the surface of the image sensor 22. However, only air jetting without using such a neutralization function provides a certain effect, and therefore the ionizer is not necessarily required.

The second cleaning unit 5 is a cleaning device for performing the contact type cleaning on the detection device surface. According to the present exemplary embodiment, the second cleaning unit 5 perform the wipe-off cleaning by using the wiper attached mainly at the tip of the core member to directly wipe the surface of the image sensor 22 positioned near the second cleaning unit 5, thus wiping off dust. The wiper made of a microfiber cloth, paper, or tape is a take-up type. The second cleaning unit 5 comes into contact with the cleaning surface and moves thereon to perform the wipe-off cleaning. At the same time, a new wiper contacts the cleaning surface. In addition, the present exemplary embodiment is configured to perform the cleaning with a solvent for greasy dirt removal applied to the wiper as required. Specific configurations of the first cleaning unit 4 and the second cleaning unit 5 are not particularly limited as long as these units are a non-contact type cleaning device and a contact type cleaning device, respectively.

Figure 3:
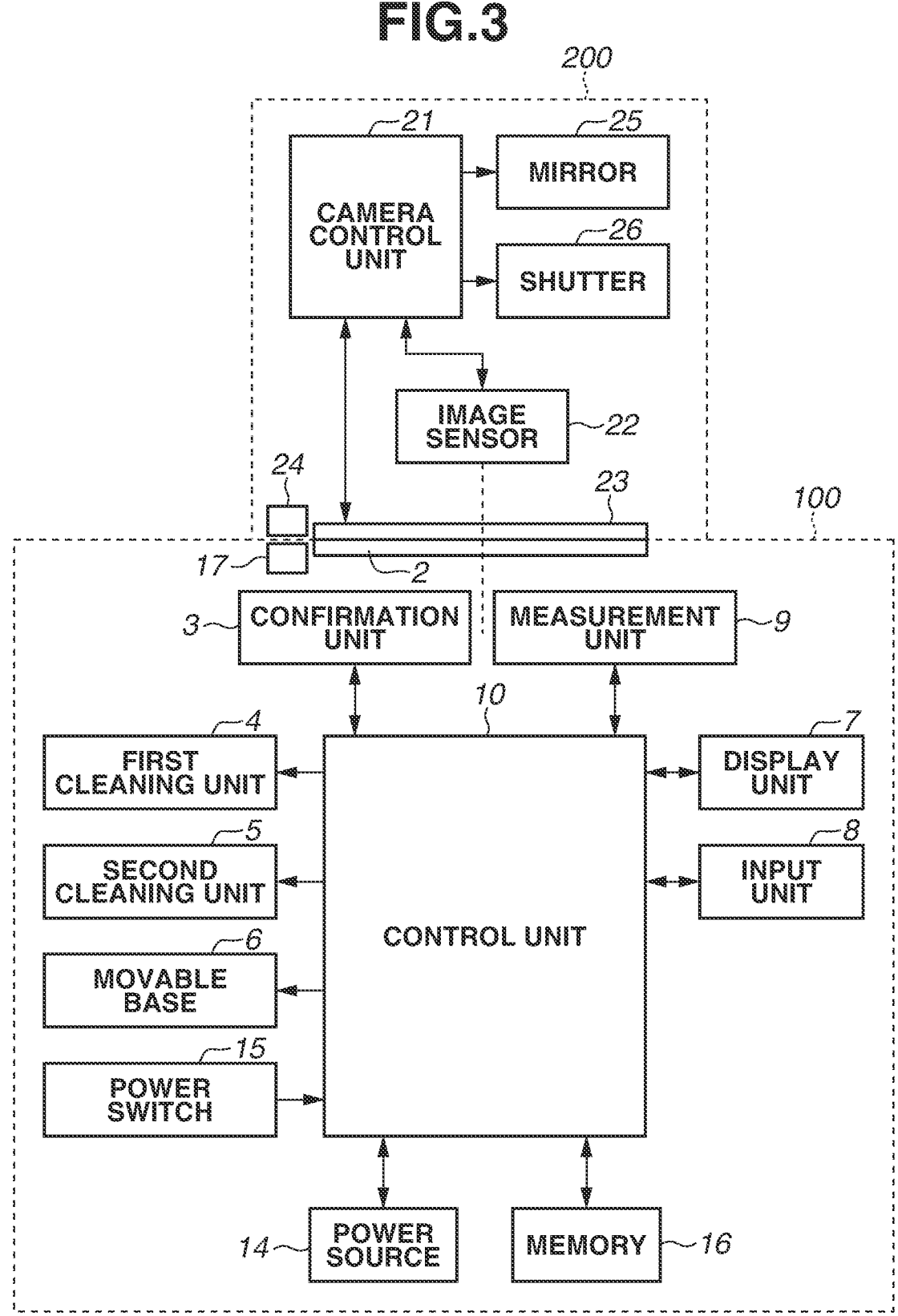
FIG. 3 is a block diagram illustrating a main configuration of the cleaning apparatus and the imaging apparatus according to the exemplary embodiment.

FIG. 3 is a block diagram illustrating main electrical configurations of the cleaning apparatus 100 and the camera 200 according to the present exemplary embodiment.

The cleaning apparatus 100 operates with electric power supplied from the power source 14. Power of the cleaning apparatus 100 is turned ON and OFF by using a power switch 15. The display unit 7 displays various information about the cleaning apparatus 100 and the camera 200, such as operating states, settings through user operations, and guidance for user operations, in response to an instruction from the control unit 10.

In order for to perform suitable operations depending on the attached camera, the input unit 8 inputs information about the external apparatus stored in a memory 16 or acquired via the communication unit 17 or other communication paths. The input unit 8 also inputs various instruction information based on user operations. The present exemplary embodiment acquires model information and specification information about the camera 200 to be connected to the cleaning apparatus 100, as external apparatus information via the input unit 8.

A measurement unit 9 including, for example, a laser range finder measures the position (coordinates and the distance to the image sensor) and size of the image sensor 22 of the connected camera 200. If the model information for the attached camera 200 is determined and the corresponding cleaning program is stored in the memory 16, it is not necessary to provide the measurement unit 9 to measure the position and size of the image sensor 22. The control unit 10 including a computer including the CPU built in the main body 1 of the cleaning apparatus 100 performs the operation control of the cleaning apparatus 100, processes information received from each unit, and issues instructions to each unit.

When the camera fixing portion 23 is attached to the fixing unit 2, the control unit 10 detects that the connection terminal provided in the fixing unit 2 is electrically connected with the connection terminal of the camera mount and accordingly detects the connection of the camera 200.

The communication unit 17 performs communication with the detection apparatus having a detection device. According to the present exemplary embodiment, a connection terminal conforming to the Universal Serial Bus (USB) specifications is electrically connected with the camera communication unit 24 of the camera 200 via a connection cable. When the connection cable is connected to the terminals of the communication unit 17 and the camera communication unit 24 in a state where power of both the cleaning apparatus 100 and the camera 200 is turned ON, electrical connection is made and communication is established between the cleaning apparatus 100 and the camera 200. The method of communication between the cleaning apparatus 100 and the camera 200 is not limited thereto. Applicable known communication methods include wired local area network (LAN), High-Definition Multimedia Interface (HDMI®), and wireless LAN (Wi-Fi®, Bluetooth®, and Bluetooth® Low Energy (BLE)).

An example of a configuration of the camera 200 detachably attached to the cleaning apparatus 100 will be described below. The camera control unit 21 is a microcomputer for performing the operation control of the image sensor 22 and the overall control of the camera 200, such as the captured image storage and data communication.

The image sensor 22 is disposed at a position accessible from an opening provided in the camera mount. Normally, the image sensor 22 has a detection surface composed of a photodiode for receiving a light flux from a subject in a state where an imaging lens is attached. The image sensor 22 converts the received light flux into an electric signal and outputs image data.

The camera 200 includes a mirror 25 disposed on the optical axis on the subject side of the image sensor 22. The mirror 25 reflects or separates the light to a sensor (not illustrated) other than the image sensor 22 or an optical view finder. When cleaning the image sensor 22, the mirror 25 needs to be retracted to a certain extent from the optical axis of the image sensor 22. According to the present exemplary embodiment, at the time of the exposure of the image sensor 22, the camera 200 retracts the mirror 25 from the optical axis to such an extent that cleaning members from the cleaning apparatus 100 can approach the image sensor 22 during the cleaning, by using a mechanism for retracting the mirror 25 from the optical axis. Although, in the present exemplary embodiment, the camera 200 as a detection apparatus is a digital single-lens reflex camera having the mirror 25, the present disclosure is also applicable to a camera having neither an optical finder nor a mirror, what is called a mirror-less single-lens camera.

The camera 200 includes a light shielding member (shutter) 26 disposed on the subject side of the image sensor 22. The shutter 26 has a role of a shutter for shielding light to the image sensor 22 during image capturing.

Various operation sequences of the cleaning apparatus 100 will be described below with reference to FIGS. 4A to 4C.

FIG. 4A is a flowchart illustrating a confirmation sequence for confirming the state (dirt and cleaning conditions) of the detection device surface to be cleaned by using the confirmation unit 3. In the entire cleaning sequence performed by the cleaning apparatus 100, the control unit 10 suitably performs the operations of this flowchart or issues operation instructions to each unit. In the initial stage of this confirmation sequence, the camera 200 has already been fixed to the cleaning apparatus 100 via the camera fixing portion 23 and the fixing unit 2, and communication has already been established between the camera 200 and the cleaning apparatus 100 via the camera communication unit 24 and the communication unit 17 of the fixing unit 2.

In step S100, the control unit 10 controls the movable base 6 to direct the confirmation unit 3 toward the fixing unit 2 and move the confirmation unit 3 to pass through the fixing unit 2 and the camera fixing portion 23, thus bringing the tip of the confirmation unit 3 close to the image sensor 22. In step S101, in the vicinity of the image sensor 22, the confirmation unit 3 irradiates the image sensor 22 with light from a point light source such as the LED provided at the tip of the confirmation unit 3. While, a non-point light source is applicable as a form of illumination, the use of a point light source is desirable since uniform light is easily incident on each element, making it possible to measure the state of the detection surface under almost the same condition.

In step S102, in a state where the detection surface is irradiated with the illumination light, the control unit 10 transmits a signal to the camera control unit 21 via the communication unit 17 and the camera communication unit 24 to instruct the image sensor 22 to perform an image capturing operation. In step S103, the control unit 10 acquires a captured image. In step S104, the control unit 10 records the acquired image in the memory 16 via the communication unit 17. At the same time, the control unit 10 displays the image converted into a display image on the display unit 7. At this timing, the control unit 10 performs known image analysis, such as singular point detection, on the captured and recorded image to detect the state of the image sensor surface and information about dust and dirt. Then, the control unit 10 displays these pieces of information on the display unit 7 together with the image. According to the present exemplary embodiment, based on these pieces of information, the control unit 10 performs the confirmation of the initial state of the imaging plane, the cleaning completion determination after the cleaning, and the comparative presentation before and after the cleaning. According to the present exemplary embodiment, in a certain confirmation sequence after the cleaning, the control unit 10 is able to perform the comparative presentation, on the display unit 7, before and after the cleaning to inform the user of cleaning effects and remaining dust. After image recording, then in step S105, the confirmation unit 3 retracts from the vicinity of the image sensor 22. Then, the confirmation sequence ends.

FIG. 4B is a flowchart illustrating a first cleaning sequence for cleaning the detection device surface through a non-contact type cleaning method by using the first cleaning unit 4. In the entire cleaning sequence performed by the cleaning apparatus 100, the control unit 10 suitably performs the operations of this flowchart or issues operation instructions to each unit. In the initial stage of this cleaning sequence, the camera 200 has already been fixed to the cleaning apparatus 100 via the camera fixing portion 23 and the fixing unit 2, and communication has already been established between the camera 200 and the cleaning apparatus 100 via the camera communication unit 24 and the communication unit 17.

In step S110, the control unit 10 controls the movable base 6 to direct the first cleaning unit 4 toward the fixing unit 2 and move the first cleaning unit 4 to pass through the fixing unit 2 and the camera fixing portion 23, thus bringing the cleaning members (tip) of the first cleaning unit 4 close to the image sensor 22. In step S111, the first cleaning unit 4, positioned in the vicinity of the image sensor 22, jets out air from the nozzle at the tip.

Figure 6A:
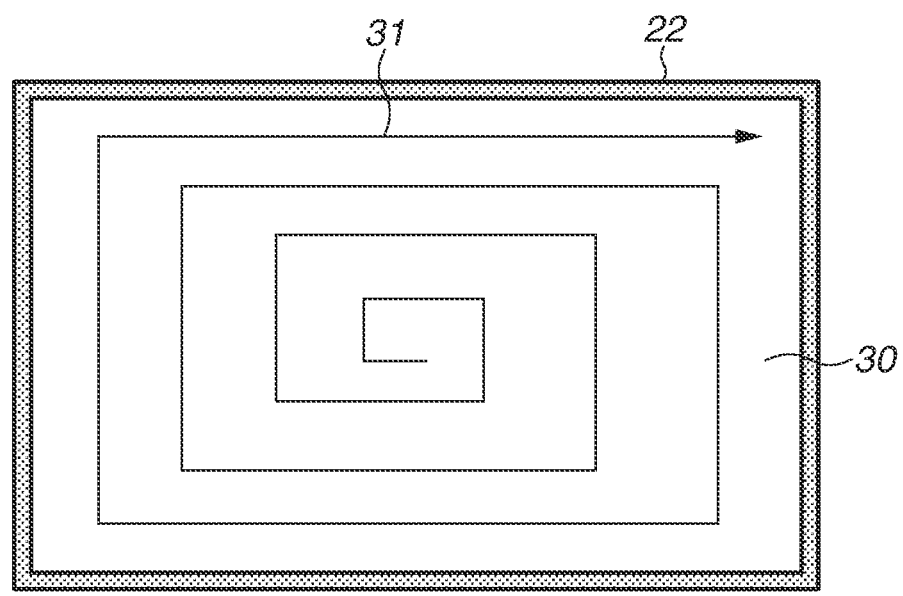
FIGS. 6A and 6B illustrate an image sensor in a first cleaning sequence according to the exemplary embodiment.
Figure 6B:
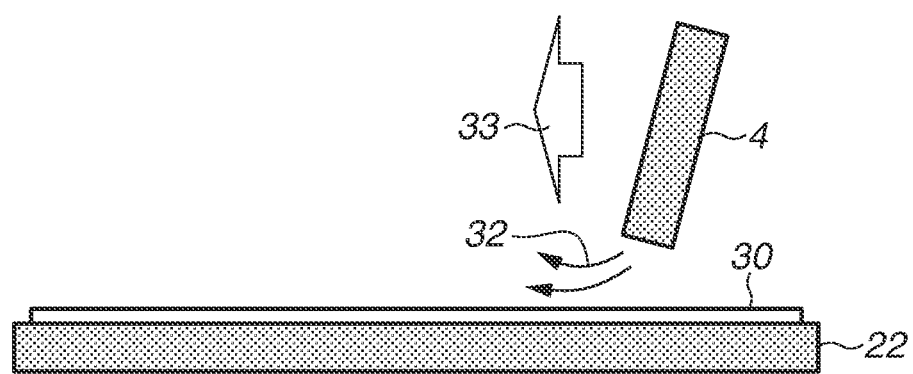

FIGS. 6A and 6B illustrate images of the cleaning method performed by the first cleaning unit 4 in step S111. FIG. 6A is a front view illustrating an image sensor surface 30 of the image sensor 22. FIG. 6B is a side view illustrating the image sensor surface 30 of the image sensor 22 in a state where the first cleaning unit 4 having approached the image sensor surface 30 is jetting out air.

As illustrated in FIG. 6A, the control unit 10 controls the movable base 6 to move the first cleaning unit 4 along a movement trajectory 31 on the image sensor surface 30 of the image sensor 22. As illustrated in FIG. 6B, the first cleaning unit 4 is controlled to jet out air in a traveling direction 33 during movement. The movement trajectory 31 is set to advance from the center of the image sensor 22 outward so that a spiral pattern is drawn. Drawing the movement trajectory 31 in this way enables blowing off dust adhering to the image sensor surface 30 out of the image sensor 22 and preventing dust having been once brown off from re-adhering to the image sensor surface 30. In addition, the first cleaning unit 4 is moved while being inclined to jet out air in the traveling direction 33. This makes it possible to obtain an effect of blowing off dust out of the image sensor 22 and operate the first cleaning unit 4 while avoiding the light shielding member disposed in the vicinity of an end of the image sensor surface 30.

By jetting out air in this way, the first cleaning unit 4 is able to remove comparatively large solid dust and dirt adhering to the image sensor surface 30 of the image sensor 22. For example, if the second cleaning unit 5 performs the wipe-off cleaning on the image sensor surface 30 in a state where comparatively large dust adheres thereto, the image sensor surface 30 may be damaged by the dragged dust. On the other hand, the non-contact type cleaning method performed by the first cleaning unit 4 has an effect that dust is not dragged on the image sensor surface 30 and the image sensor surface 30 is less likely to be damaged.

According to the present exemplary embodiment, the control unit 10 controls the movable base 6 so that the first cleaning unit 4 does not come into contact with the image sensor surface 30 of the image sensor 22 throughout the first cleaning sequence. This enables reducing the possibility of damaging the image sensor surface 30 of the image sensor 22, to a further extent. After jetting out air, then in step S112, the first cleaning unit 4 retracts from the vicinity of the image sensor 22. At this timing, the first cleaning sequence ends.

FIG. 4C is a flowchart illustrating the second cleaning sequence for performing the contact type cleaning on the detection device surface by using the second cleaning unit 5. In the entire cleaning sequence performed by the cleaning apparatus 100, the control unit 10 suitably performs the operations of this flowchart or issues operation instructions to each unit. In the initial stage of this second cleaning sequence, the camera 200 has already been fixed to the cleaning apparatus 100 via the camera fixing portion 23 and the fixing unit 2, and communication has already been established between the camera 200 and the cleaning apparatus 100 via the camera communication unit 24 and the communication unit 17 of the fixing unit 2.

In step S120, the control unit 10 controls the movable base 6 to direct the second cleaning unit 5 toward the fixing unit 2 and move the second cleaning unit 5 to pass through the fixing unit 2 and the camera fixing portion 23, thus bringing the cleaning members (tip) of the second cleaning unit 5 close to the image sensor 22. When using a solvent for greasy dirt removal in the wipe-off cleaning, the control unit 10 controls the movable base 6 to soak the tip of the second cleaning unit 5 in a container containing the solvent disposed at another rotating position and then direct the second cleaning unit 5 toward the fixing unit 2. In step S121, in the vicinity of the image sensor 22, the second cleaning unit 5 brings its tip into contact with the image sensor 22 and wipe off the surface of the image sensor 22 with a wiper (cloth or paper) attached to the tip. In step S122, the control unit 10 determines whether a force F applied to the second cleaning unit 5 during the wipe-off cleaning exceeds a threshold value based on the result of measurement of the force F by using a detector such as a load cell. When the force F exceeds the threshold value (NO in step S122), the processing returns to step S121. In step S121, the control unit 10 wipes the same position again. On the other hand, when the force F is less than or equal to the threshold value (YES in step S122), the processing proceeds to step S123. In step S123, the control unit 10 moves the cleaning target position. After moving the cleaning target position, then in step S124, the control unit 50 determines whether the wipe-off cleaning is completed for all positions on the detection device surface. When the wipe-off cleaning is not completed (NO in step S124), the processing returns to step S121. The control unit 10 performs the wipe-off cleaning at the new cleaning target position. On the other hand, when the wipe-off cleaning is completed (YES in step S124), the processing proceeds to step S125. In step S125, the control unit 10 retracts the second cleaning unit 5.

Figure 7A:
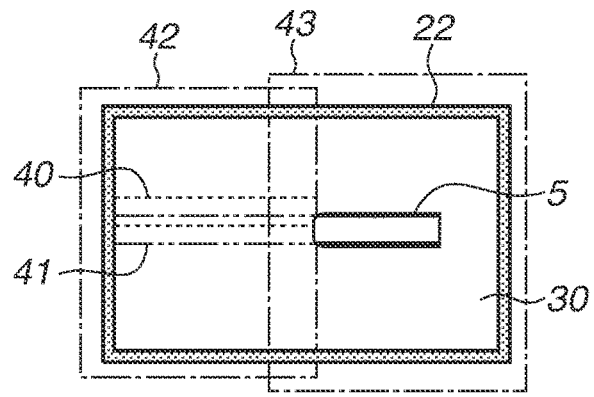
FIGS. 7A, 7B, 7C, and 7D illustrate the image sensor in a second cleaning sequence according to the exemplary embodiment.
Figure 7C:
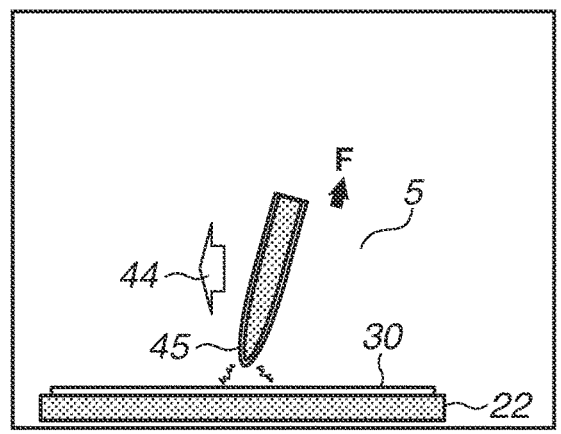
Figure 7B:
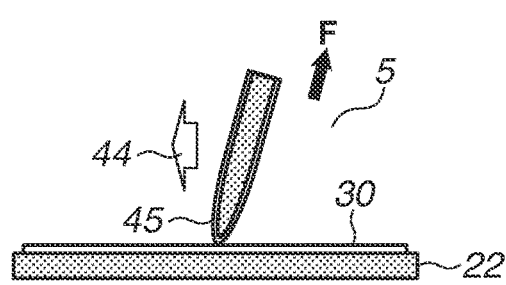

FIGS. 7A to 7D illustrate the cleaning method performed by the second cleaning unit 5 in step S121. FIG. 7A is a front view illustrating the image sensor surface 30 of the image sensor 22. FIG. 7B is a side view illustrating the image sensor surface 30 of the image sensor 22 in a state where the second cleaning unit 5 in contact with the image sensor surface 30 is wiping the image sensor surface 30 by using the wiper at the tip.

As illustrated in FIG. 7A, the control unit 10 controls the movable base 6 to perform the wipe-off cleaning on the image sensor surface 30 of the image sensor 22 by using the wiper at the tip while moving the second cleaning unit 5 on the image sensor surface 30. As illustrated in FIG. 7B, the second cleaning unit 5 is controlled to move in a state of being inclined toward the cleaning direction (traveling direction) 44 and in contact with the image sensor surface 30.

As illustrated in FIG. 7A, the second cleaning unit 5 performs the wipe-off cleaning on the image sensor surface 30 by scanning cleaning areas to be partially overlapped with each other as with a first movement trajectory 40 and a second movement trajectory 41. In addition, the second cleaning unit 5 overlaps a first cleaning area 42 with a second cleaning area 43 to prevent unwiped portions from arising. To prevent unwiped portions from arising and to wipe away dust out of the image sensor surface 30, it is basically desirable to wipe the image sensor surface 30 in the same direction in both of cleaning areas. FIG. 7B illustrates a state where the second cleaning unit 5 is performing the wipe-off cleaning on the inside of the first cleaning area 42 in the cleaning direction 44. In this case, the second cleaning unit 5 contacts the image sensor surface 30 while being inclined toward the direction opposite to the cleaning direction 44 with respect to the plane perpendicular to the cleaning direction 44, to make the second cleaning unit 5 smoothly move. In addition, if pixels at an end on the image sensor surface 30 are hidden by a light shielding member, the second cleaning unit 5 is moved to perform scanning while being inclined as illustrated in FIG. 7B, to make it possible to perform the wipe-off cleaning on the surface from corner to corner without contacting the light shielding member.

If the large force F is applied to the image sensor surface 30 and the image sensor surface 30 of the image sensor 22 has a large surface resistance, the second cleaning unit 5 cannot smoothly wipe the surface and a wiper 45 may bounce on the image sensor surface 30. FIG. 7C illustrates a state where the second cleaning unit 5 bounces. If the second cleaning unit 5 bounces, an unwiped position arises and dirt remains at the position. According to the present exemplary embodiment, to prevent this phenomenon, the control unit 10 detects the force F applied to the second cleaning unit 5 by using a load cell, and controls (adjusts) the force F to be applied to the second cleaning unit 5 by using an actuator provided together with the load cell. A specific control method will be described with reference to FIG. 7D.

Figure 7D:
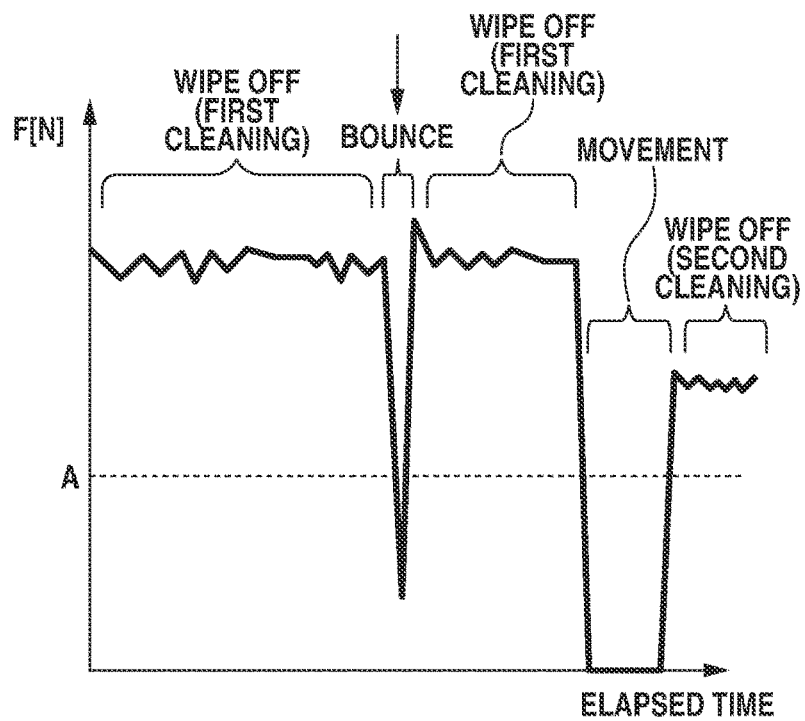

FIG. 7D is a graph in which the vertical axis is assigned to the force F applied to the second cleaning unit 5 and the horizontal axis is assigned to the elapsed time. When the force F applied to the cleaning surface falls below a threshold value A for detecting a bounce, the control unit 10 detects that the second cleaning unit 5 has bounced. Then, the second cleaning unit 5 decreases the force F to be applied to the cleaning surface via the actuator and performs the wipe-off cleaning again on the position where the bounce occurred. For example, if the control unit 10 detects a bounce on the first movement trajectory 40, the control unit 10, after completion of the cleaning (first wipe-offcleaning) for the first movement trajectory 40, separates the wiper 45 from the image sensor surface 30, moves the wiper 45 to the starting point on the first movement trajectory 40, and performs the cleaning again (second wipe-off cleaning). In this case, the control unit 10 deceases the force F to be applied to the second cleaning unit 5 via the actuator and performs the wipe-off cleaning. If cleaning is completed without detecting a bounce, the second cleaning unit 5 moves to the second movement trajectory 41. Subsequent cleaning is performed with the decreased force F to be applied to the second cleaning unit 5. This enables preventing bounces in subsequent cleaning. The above-described procedure enables the second cleaning unit 5 to entirely wipe the image sensor surface 30, preventing dirt from remaining. In this case, the control unit 10 may control the second cleaning unit 5 to perform the second wipe-off cleaning only in the vicinity of the position where a bounce was detected.

In the wipe-off cleaning in step S121, the control unit 10 determines whether a detection device of the same type was cleaned in the past. When a detection device (image sensor) of the same type was cleaned, the control unit 10 controls the force F with reference to past force control information stored in the memory 16. This determination may be performed based on an input from the user or identification (ID) information received from the detection apparatus (camera 100).

By performing the above-described procedure, the second cleaning unit 5 is able to remove dust and highly adhesive greasy dirt adhering to the surface of the image sensor 22. Upon completion of the cleaning, then in step S122, the second cleaning unit 5 retracts from the vicinity of the image sensor 22. Then, the second cleaning sequence ends.

As described above, if a bounce occurs during the cleaning of an electronic device having a detection device, the cleaning apparatus 100 decreases the force F to be applied to the cleaning surface. The control unit 10 stores control information about the control of the force F applied to the cleaning surface during the cleaning performed in steps S121 and S122 in the memory 16 of the cleaning apparatus 100, in association with the electronic device cleaned. When a detection apparatus of the same type is determined to be a cleaning target, these pieces of information make it possible to perform the cleaning with an optimal pressing force with which no bounce occurs immediately after the cleaning starts.

Figure 5:
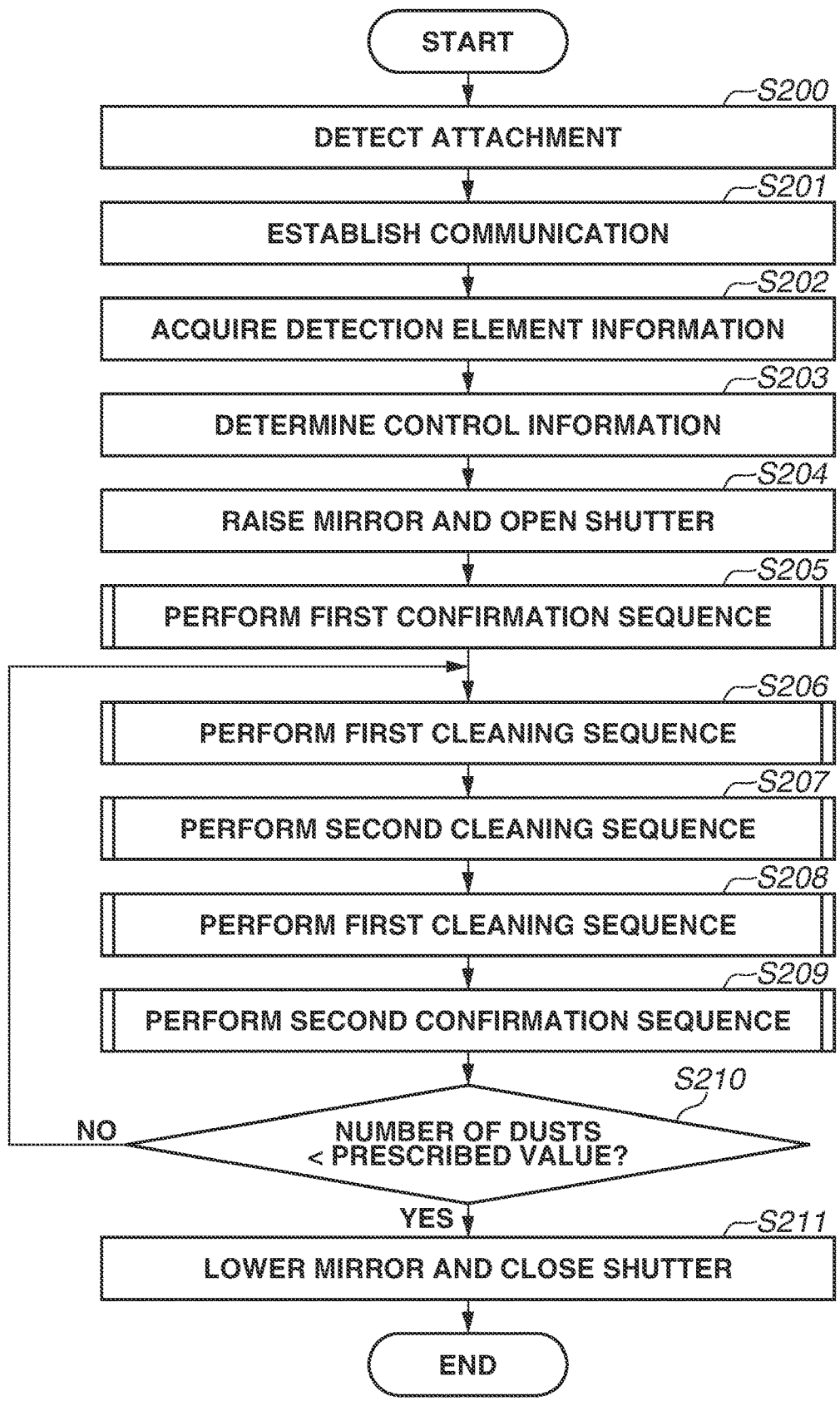
FIG. 5 is a flowchart illustrating a series of cleaning sequences according to the exemplary embodiment.

The entire cleaning sequence according to the present exemplary embodiment will be described with reference to a flowchart illustrated in FIG. 5. The control unit 10 starts this flowchart, for example, upon power ON through an operation on the power switch 15 or upon reception of a cleaning process start instruction from the input unit 8. In this flowchart, the control unit 10 performs operations or issues operation instructions to each unit.

In step S200, the control unit 10 detects that the camera fixing portion 23 of the camera 200 is attached and fixed to the fixing unit 2 via the connection terminal provided in the fixing unit 2. In step S201, the control unit 10 detects that the communication unit 17 and the camera communication unit 24 are electrically connected and, upon the detection as a trigger, establishes communication between the cleaning apparatus 100 and the camera 200.

In step S202, the control unit 10 acquires detection device information for the detection device to be cleaned. As the detection device information, the control unit 10 acquires information about the position, size, and material of the image sensor 22, and the position of a cleaning member that disturbs the cleaning of the image sensor 22. These pieces of information may be acquired from the camera 200 via communication, or acquired by reading the above-described detection device information from a database pre-stored in the memory 16 based on the model information acquired from the camera 200. The control unit 10 may also acquire the detection device information or the model information for the camera 200 through a user input via the input unit 8. In this step, if the confirmation unit 3 is a sensor for detecting the state of the image sensor 22, the control unit 10 acquires the detection device information based on, for example, image information detected by the confirmation unit 3.

In step S203, the control unit 10 determines control information based on the detection device information for the image sensor 22 obtained in step S202. More specifically, based on the position and size information for the image sensor 22, the control unit 10 determines the drive width when advancing or retreating the confirmation unit 3, the first cleaning unit 4, and the second cleaning unit 5 by using the movable base 6 and controls the distance to the detection surface. The control unit 10 also determines the position and intensity of air jetting by the first cleaning unit 4, the range of the wipe-off cleaning by the second cleaning unit 5, and the presence or absence of a solvent to be applied to the wiper. According to the present exemplary embodiment, a plurality of cleaning courses using at least one of the first cleaning unit 4 and the second cleaning unit 5 are prepared. For example, the user is able to select a desired cleaning course from the plurality of candidates displayed on the display unit 7 in consideration of the dirt condition and working time. Examples of cleaning courses to be prepared include the followings. According to the present exemplary embodiment, the subsequent processing flow (described below) is on the premise that Course 1 is selected. If another course is selected, steps unnecessary for the selected course are to be suitably omitted (skipped with no operation performed). Settable courses are not limited thereto. The user may create an arbitrary course by freely setting various sequences as follows:

Course 1: First confirmation sequence→First cleaning sequence→Second cleaning sequence→First cleaning sequence→Second confirmation sequence Course 2: First confirmation sequence→First cleaning sequence→Second cleaning sequence→Second confirmation sequence Course 3: First confirmation sequence→Second cleaning sequence→First cleaning sequence→Second confirmation sequence Course 4: First confirmation sequence→First cleaning sequence→Second confirmation sequence Course 5: First confirmation sequence→Second cleaning sequence→Second confirmation sequence Course 6: First confirmation sequence In step S204, in order to perform various sequences on the image sensor 22, the control unit 10 transmits an instruction signal for raising the mirror 25 and opening the shutter 26 to the camera control unit 21. Upon reception of the instruction signal for raising the mirror 25 and opening the shutter 26, the camera control unit 21 raises the mirror 25, opens the shutter 26, and then transmits a notification signal for notifying that the operations are completed to the control unit 10. Upon reception of this signal by the control unit 10, the processing proceeds to the following step. However, for a certain camera model such as a mirror-less single-lens camera described above, the image sensor 22 can be cleaned without being shielded even if step S204 is skipped. In this case, step S204 and step S211 (described below) do not need to be performed.

In step S205, the control unit 10 performs the confirmation sequence illustrated in FIG. 4A as the first confirmation sequence before the cleaning. In step S206, the control unit 10 performs the first cleaning sequence by using the first cleaning unit 4 illustrated in FIG. 4B. After completing the first cleaning sequence, in step S207, the control unit 10 performs the second cleaning sequence by using the second cleaning unit 5 illustrated in FIG. 4C. In this case, the control unit 10 performs the first cleaning sequence before the second cleaning sequence in order to remove a large dust in the first cleaning sequence in advance. This intends to prevent the image sensor surface 30 from being damaged by a large dust adhering to the image sensor surface 30 while being dragged thereon during the wipe-off cleaning by the second cleaning unit 5.

After completing the second cleaning sequence, in step S208, the control unit 10 performs the first cleaning sequence again by using the first cleaning unit 4. The operations in the first and the second sequences may be similar to or different from the operations in step S206. In this case, the control unit 10 performs the first cleaning sequence after the second cleaning sequence because, in the wipe-off cleaning by the second cleaning unit 5, fibers of the wiper remain on the image sensor surface 30 or dust pushed out of the image sensor surface 30 remain in the periphery. Performing the first cleaning sequence after the second cleaning sequence enables blowing off the dust.

Upon completing the first cleaning sequence in step S208, in step S209, the control unit 10 performs the second confirmation sequence after the cleaning illustrated in FIG. 4A. The second confirmation sequence differs from the first confirmation sequence in that images, the number of dusts, and other conditions before and after the cleaning can be displayed in comparable form on the display unit 7 in step S104. In step S210, based on the image information after the cleaning acquired in step S209, the control unit 50 determines whether the number of dusts falls below a prescribed value. When the number of dust does not fall below the prescribed value (NO in step S210), the processing returns to step S206. Then, the control unit 10 perform the cleaning again. At this time, it is desirable to change various parameters for cleaning and perform each cleaning sequence again in order to remove remaining dust after completing each cleaning sequence. Examples of possible parameter changes include increasing the intensity of air jetting by the first cleaning unit 4, increasing the intensity of charging by the ionizer, prolonging the air jetting duration, and widening the moving range. If the wiper of the second cleaning unit 5 is not applied with a solvent in the last cleaning, examples of possible parameter changes include applying the solvent to the wiper and increasing the intensity of the contact pressure on the image sensor surface 30.

On the other hand, when the number of dusts falls below the prescribed value (YES in step S210), the processing proceeds to step S211. In step S211, the control unit 10 transmits an instruction signal for lowering the mirror 25 and closing the shutter 26 to the camera control unit 21. Upon receiving the instruction signal for lowering the mirror 25 and closing the shutter 26, in step S211, the camera control unit 21 lowers the mirror 25, closes the shutter 26, and then transmits a notification signal for notifying that the operations are completed to the control unit 10. Upon reception of this signal by the control unit 10, the processing ends.

Although, in the present exemplary embodiment, the control unit 10 detects the number of dusts remaining on the image sensor 22 to confirm the cleaning condition in step S210, the present disclosure is not limited thereto. The control unit 10 may use other analysis results as a reference as long as it indicates the state of the image sensor 22 analyzable based on an image. Although, in the present exemplary embodiment, the control unit 10 repetitively performs each cleaning sequence until the number of dusts falls below the prescribed value, the control unit 10 may only display the cleaning result, such as the number of dusts, on the display unit 7 without providing a particular repetitive processing flow.

According to the present exemplary embodiment, as described above, the control unit 10 performs the wipe-off cleaning by the first cleaning unit 4 on the detection surface of the detection device for detecting a physical quantity by air pressure (air jetting) and then performs the wipe-off cleaning by the second cleaning unit 5 in contact with the detection surface. In this way, a plurality of types of dusts adhering to the detection surface can be suitably removed. In addition, performing the non-contact type cleaning again after the wipe-off cleaning enables removing fibers of the wiper remaining in the wipe-off cleaning, dust having failed to be removed, and dust around the detection surface. In addition, by capturing an image of the detection surface before and/or after the cleaning and obtaining the captured image of the detection surface, the detection surface condition before and/or after the cleaning can be confirmed. In this case, the use of a point light source for irradiating the detection surface enables acquiring an image having a deeper depth of field and facilitating the dust recognition, making it easier to visually recognize or detect dust remaining on the detection surface. Analyzing a captured image of the detection surface enables analyzing the dust condition, making it possible to display the number of dusts and measures for improving the visibility of dust.

Since the cleaning apparatus 100 is provided with a plurality of cleaning units to perform a plurality of cleaning sequences, the cleaning apparatus 100 supports the removal of a plurality of types of dusts adhering to the detection surface of a detection apparatus having a detection device.

Figure 8:
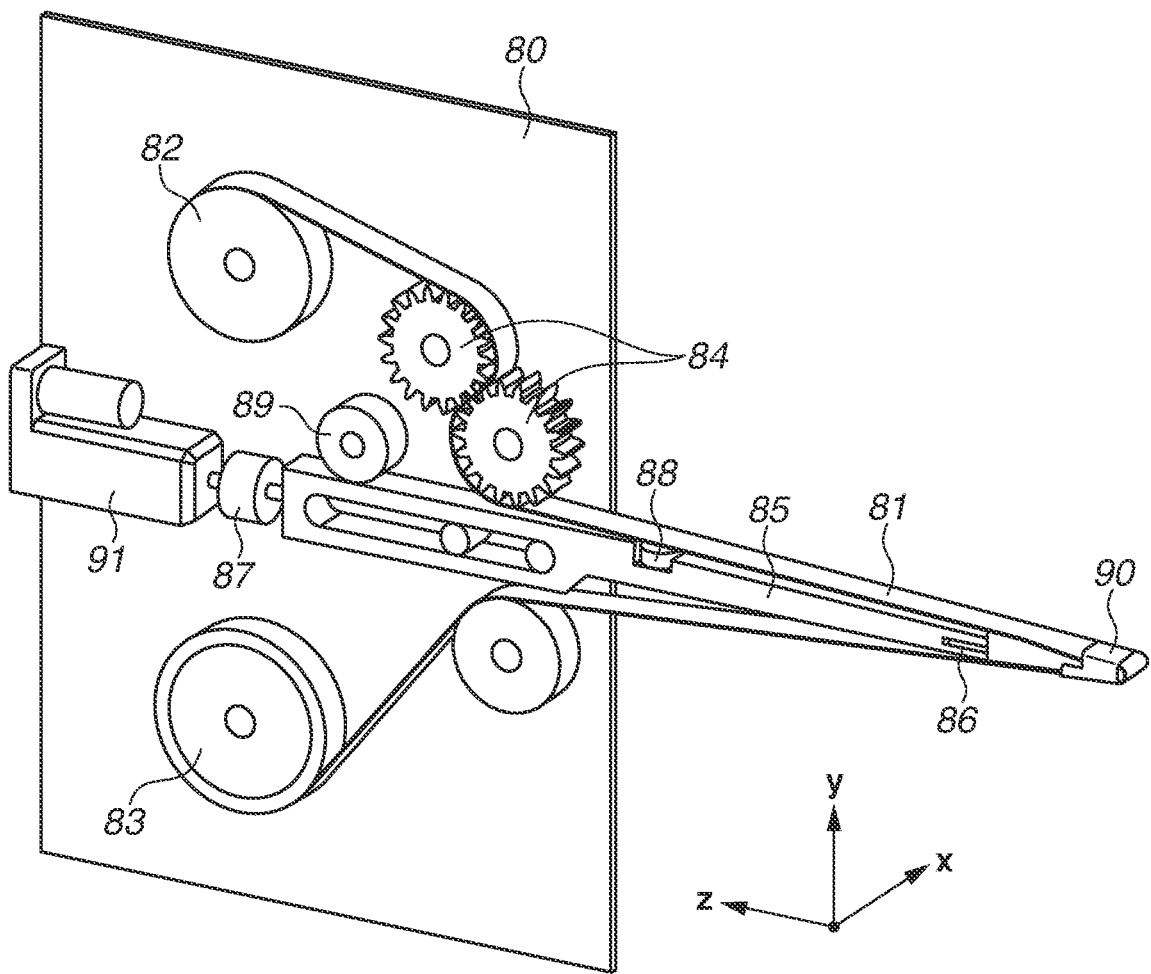
FIG. 8 illustrates an overview of a second cleaning unit according to the exemplary embodiment.

A configuration of the second cleaning unit 5 according to the present exemplary embodiment will be described below with reference to FIG. 8. FIG. 8 illustrates an example of the configuration of the second cleaning unit 5. A base plate 80 is provided with a fiber tape 81 with woven microfibers for wiping off dust, a take-up unit 82 for taking up the fiber tape 81, a reel-out unit 83 for feeding the fiber tape 81, and gears 84 for controlling the take-up amount. A core member 85 is provided with a tip core member 86 made of a metal at the tip, and a load cell 87 at the root (the other end). The root (the other end) of the load cell 87 is provided with an actuator 91. The load cell 87 detects a force applied to the image sensor surface 30. Based on the detection result, the control unit 10 controls the force to be applied to the image sensor surface 30 by using the actuator 91. A vibrator 88 applies a vibration to the tip core member 86. A roller 89 as a metal part in contact with the core member 85 regulates the drive direction of the core member 85. A guide member 90 molded by resin regulates the movement of the fiber tape 81. The vibrator 88 generates a vibration by a piezoelectric element or the actuator 91 to apply a Z-directional minute vibration to the tip core member 86 during the cleaning operations. Since this minute vibration reduces the frictional force between the fiber tape 81 and the image sensor surface 30, smooth cleaning operations can be performed. In addition, since the vibration of the vibrator 88 also reduces the frictional force between the fiber tape 81, the guide member 90, and the tip core member 86, smooth take-up of the fiber tape 81 can be performed.

Now, operations of the second cleaning unit 5 will be described in detail. The gears 84 take up the fiber tape 81 while biting it to pull out an unused portion of the fiber tape 81 from the reel-out unit 83. The unused portion of the pulled-out fiber tape 81 is used for the cleaning at the tip core member 86. The used portion of the fiber tape 81 is taken up by the take-up unit 82. The fiber tape 81 is regulated in movement by the guide member 60 and is taken up while covering the tip core member 86. When the cleaning is started, the fiber tape 81 stretched by the tip core member 86 is pressed onto the image sensor 22, thus performing the dust wipe-off operation. At this time, the core member 85 can slide in the pressing direction (Z direction illustrated in FIG. 8) to provide suitable pressure for the cleaning while crushing the load cell 87. Since the load cell 87 applies suitable pressure to the image sensor surface 30, dust can be removed without damaging the image sensor 22. Even during the movement of the core member 85, the metal roller 89 is in contact with the core member 85, to ensure the electrical connection between the fixing unit 2 and the core member 85 via the metal roller 89. During the wipe-off operation, the vibrator 88 attached on the core member 85 vibrates the core member 85 to reduce the friction between the pressed fiber tape 81 and the image sensor surface 30, thereby achieving sooth cleaning while preventing the fiber tape 81 from being caught by the image sensor surface 30.

Now, the reason and effects of the electrical connected between the core member 85 and the fixing unit 2 will be described. A potential difference between the second cleaning unit 5 and the image sensor surface 30 (image sensor 22) may cause a problem that dust once removed is attracted to the image sensor surface again by electrostatic force. In addition, although the contact type cleaning provides a high dust removal capacity, the contact type cleaning has a problem that static electricity is likely to accumulate on the imaging plane since the wipe-off operation is performed in a reciprocal way. Static electricity arising on the imaging plane may attract dust floating in the air. According to the present exemplary embodiment, therefore, the fixing unit 2 and the core member 85 are electrically connected to become equipotential, i.e., the potential of the fixing unit 2 (conduction member) or the ground potential. In this way, the second cleaning unit 5 is configured to have no potential difference from the image sensor 22, which is at the ground potential. Thus, the extremely small potential difference between the second cleaning unit 5 and the image sensor surface 30 makes it possible to prevent dust from being attracted to the image sensor surface 30.

According to the present exemplary embodiment, also in air cleaning by the first cleaning unit 4, air ionized by the ionizer is blown against the image sensor surface 30. This neutralizes the image sensor surface 30 to prevent the image sensor surface 30 from being charged for a certain reason to attract dust, and prevent a potential difference from being generated between the image sensor surface 30 and the second cleaning unit 5 during the subsequent cleaning by the second cleaning unit 5.

Figure 9A:
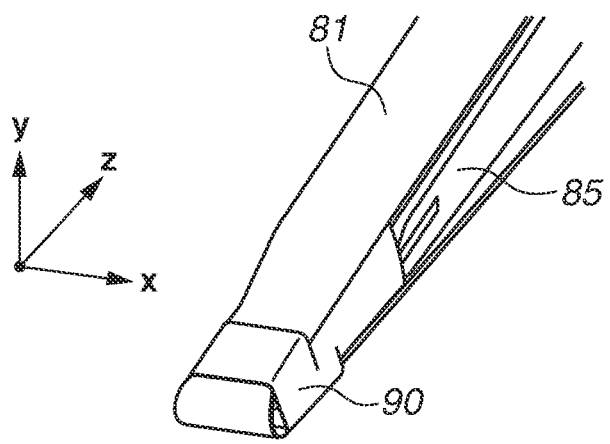
FIGS. 9A, 9B, and 9C illustrate a configuration of a tip portion of the second cleaning unit according to the exemplary embodiment.
Figure 9B:
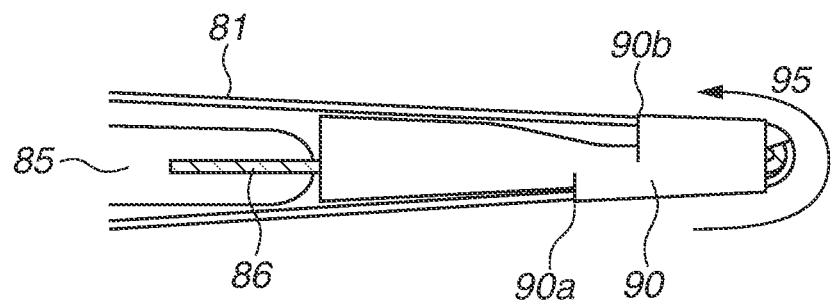
Figure 9C:
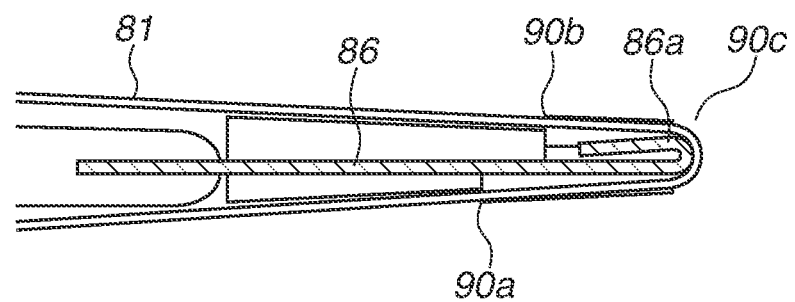

Next, a configuration of the tip portion of the second cleaning unit 5 that comes near the image sensor surface 30 will be described with reference to FIGS. 9A to 9C. FIG. 9A is a perspective view illustrating a detailed configuration of the tip portion of the second cleaning unit 5 that comes near the image sensor surface 30. FIGS. 9B and 9C are a side view and a longitudinal cross-sectional view, respectively, illustrating the second cleaning unit 5. The fiber tape 81 is regulated in the XY-directional movement by the guide member 90 and in the Z-directional movement by the tip core member 86.

As illustrated in FIGS. 9B and 9C, the guide member 90 is provided with a reel-out slot 90a and a reel-in slot 90b for the fiber tape 81, which are disposed at opposite positions across the tip core member 86. The reel-out slot 90a for the fiber tape 81 is a cut opening formed on the guide member 90. When the fiber tape 81 is taken up and moved in the direction of the arrow 95, the guide member 90 and the tip core member 86 starts pinching the fiber tape 81 and regulating the XY-directional movement of the fiber tape 81.

The reel-in slot 90b for the fiber tape 81 is a cut opening formed on the guide member 90. In a range from an opening 90c at the tip of the guide member 90 to the reel-in slot 90b, the guide member 90 and the tip core member 86 pinches the fiber tape 81 to regulate the XY-directional movement of the fiber tape 81 while the fiber tape 81 is being taken up. The reel-in slot 90b is formed at a position closer to the opening 90c than the reel-out slot 90a is. This enables regulating the XY-directional movement of the fiber tape 81 in the vicinity of the image sensor surface 30 during the cleaning.

The tip of the guide member 90 is provided with the opening 90c and is divided into the side of the reel-in slot 90b and the side of the reel-out slot 90a across the tip core member 86. The tip core member 86 is formed by bending a metal plate and is configured so that a bent R-shaped portion 86a faces the image sensor 22 during the cleaning. When the fiber tape 81 is taken up and moved, the R-shaped portion 86a having this shape prevents the fiber tape 81 from being caught by the end of the tip core member 86. After bending the end opposite to the fixing end at which the tip core member 86 is fixed to the core member 85, the fiber tape 81 is prevented from being caught by the end also by disposing the tip portion of the tip core member 86 on the side of the reel-in slot 90b.

Figure 10:
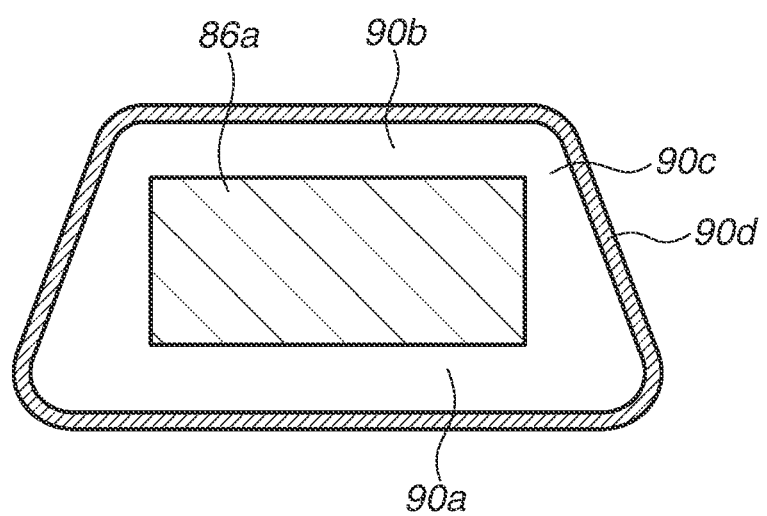
FIG. 10 is a front view illustrating the configuration of the tip portion of the second cleaning unit according to the exemplary embodiment.

FIG. 10 illustrates the opening 90c when viewed from the Z direction, where the fiber tape 81 is omitted for the sake of description. As illustrated in FIG. 10, the shape of the opening 90c is formed of a continuous surface 90d so that the X-directional width of the opening 90c decreases with increasing distance from the reel-out slot 90a and decreasing distance to the reel-in slot 90b. In particular, the X-directional size of the reel-in slot 90b is set to be smaller than the X-directional width of the fiber tape 81, and the X-directional size of the reel-out slot 90a is set to be larger than the X-directional width of the fiber tape 81.

FIG. 11A illustrates the tip portion of the second cleaning unit 5 when viewed from the reel-in slot 90b. The X-directional size of the reel-in slot 90b is set to be smaller than the width of the fiber tape 81 itself when the fiber tape 51 enters the reel-in slot 90b from the reel-out slot 90a at the opening 60c. For this reason, the fiber tape 81 enters the reel-in slot 90b with the both ends inwardly folded toward the core member 85.

FIG. 11B is cross-sectional view illustrating the tip portion of the second cleaning unit 5 taken along the dashed line when viewed from the arrow direction illustrated in FIG. 11A. The both ends of the fiber tape 81 are inwardly folded in this way, if the fiber tape 81 moves in the X direction, the track of the fiber tape 81 is returned to the center by repulsive forces generated at the both ends. This enables the second cleaning unit 5 to clean the image sensor surface 30 with a stable track without the deviation of the fiber tape 81 on one side in the X direction.

Since the fiber tape 81 is prevented from deviating on one side in the X direction, the contact portion of the fiber tape 81 can be made parallel to the image sensor surface 30. In addition, since pressure can be uniformly applied to the image sensor surface 30, the second cleaning unit 5 is able to perform the cleaning with less inconsistencies in wiping than in a case where the both ends are not inwardly folded.

The fiber tape 81 is inwardly folded along the continuous surface 90d of the guide member 90. Therefore, when the fiber tape 81 enters the reel-in slot 90b from the reel-out slot 90a at the opening 90c, the fiber tape 81 can be prevented from being caught by the guide member 90.

When the fiber tape 81 is drawn out of the reel-in slot 90b, the both ends of the fiber tape 81 inwardly folded return to a flat state, and then the fiber tape 81 is taken up by the gears 84.

As illustrated in FIGS. 7A to 7D, the second cleaning unit 5 moves in the longitudinal direction of the image sensor 22 while maintaining the fiber tape 81 in contact with the image sensor surface 30 to wipe the surface of the image sensor 22. In order to cope with image sensors of various sizes, it is desirable that the width of the fiber tape 81 is smaller than or equal to the widthwise length of the effective pixel range for a minimum-sized image sensor of an imaging apparatus attachable to the cleaning apparatus 100.

On the other hand, in order to shorten the cleaning time, it is desirable that a wide range can be wiped in a single operation. For this reason, it is desirable that, for the above-described minimum-sized image sensor, the width of the fiber tape 81 is larger than the widthwise length of the effective pixel area divided by 3.

This means that the second cleaning unit 5 can complete the cleaning of the entire effective pixel area by performing the wipe-off operation at least three times for each of the first cleaning area 42 and the second cleaning area 43 (see FIGS. 7A to 7D).

The cleaning-time contact angle of the second cleaning unit 5 according to the present exemplary embodiment will be described below with reference to FIGS. 12A and 12B. FIG. 12A illustrates a case where a used surface 81b of the fiber tape 81 faces the image sensor surface 30. FIG. 12B illustrates a case where an unused surface 81a of the fiber tape 81 faces the image sensor surface 30.

In cleaning of the image sensor 22, the second cleaning unit 5 needs to clean the entire surface of only the image sensor 22 while avoiding internal parts 120 including the mirror 25 and the shutter 26 disposed in the camera 200. Accordingly, after the fiber tape 81 stretched by the core member 85 is inserted, the second cleaning unit 5 performs the cleaning while position control is being performed by using the movable base 6 following instructions from the control unit 10. In this case, if the used surface 81b of the fiber tape 81 approaches the image sensor 22, the risk that dust once removed may drop and re-adhere to the image sensor 22 may increase. Then, when cleaning is performed in a state where the used surface 81b faces the image sensor 22, as illustrated in FIG. 12A, a large angle θ1 is taken and the distance between the image sensor 22 and the used surface 81b is maintained as long as possible during the cleaning. On the other hand, when cleaning is performed in a state where the unused surface 81a faces the image sensor 22 as illustrated in FIG. 12B, since the possibility of dust re-adhesion to the image sensor 22 is low, a small angle θ2 is taken to prevent the tip from being caught by friction during the cleaning. By performing control so that θ1 is larger than θ2 in consideration of the positional relation between the fiber tape 81 and the image sensor 22, the second cleaning unit 5 is able to perform the wipe-off operation with an optimal contact angle while reducing the risk of dust re-adhesion.

It is desirable that the angle formed by the unused surface 81a and the used surface 81b is smaller than 90 degrees minus θ1. In this configuration, when the internal parts 120 included in the cameras 200 are disposed on the subject side of the image sensor 22, inclining the second cleaning unit 5 by the angle θ1 or θ2 enables the fiber tape 81 to get in under the internal parts 120 and clean the image sensor surface 30.

As described above, according to the present exemplary embodiment, the cleaning members (core member 85 and fiber tape 81) of the second cleaning unit 5 for performing the contact type wipe-off cleaning and the detection surface (image sensor surface 30) are set to equipotential (ground potential). This prevents dust attraction to the detection surface which occurs if there is a potential difference between the second cleaning unit 5 and the image sensor surface 30.

The detection surface is also subjected to the neutralization processing by using ionized air. This prevents dust attraction by the charged detection surface even with a single detection device.

The method for setting both the cleaning unit and the detection surface to equipotential is not limited to the above-described method according to the present exemplary embodiment. For example, the image sensor surface 30 and the core member 85 may be directly electrically connected at a portion different from the cleaning position.

According to the present exemplary embodiment, by devising the configuration of the cleaning portion (tip) at the tip of the second cleaning unit 5 for performing the wipe-off cleaning, the deviation of the cleaning tape (fiber tape) from a cleaning trajectory is restricted to reduce unwiped portions. More specifically, the following conditions are applied to the core member 85 and the wiper wound along the side surface of the core member 85.

A reel-out guide and a reel-in guide are provided.

For the core member 85 made of a metal, the reel-out slot 90a is provided on one surface and the reel-in slot 90b is provided on the opposite surface.

The width of the reel-in slot 90b is smaller than the tape width.

The reel-out slot 90a is wider than the reel-in slot 90b.

The reel-in slot 90b is integrally formed with the reel-out slot 90a on a continuous surface.

The exit of the reel-in slot 90b is closer to the tip than the entrance of the reel-out slot 90a is.

The core member 85 is made by bending a metal plate, and a bent end is formed on the side of the reel-in slot 90b.

Performing at least one piece of the above-described devisal enables acquiring the above-described effects to a certain extent.

While the present disclosure has specifically been described based on the above-described preferred exemplary embodiment, the present disclosure is not limited thereto including the layout of an apparatus and a combination of sequences, and can be modified in diverse ways within the ambit of the appended claims.

According to the present disclosure, it is possible to suitably support removal of dust adhering to the detection surface of a detection device having a detection surface.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-176520, filed Sep. 20, 2018, which is hereby incorporated by reference herein in its entirety.

What is claimed is:

1. A cleaning apparatus that cleans a detection device having a detection surface, the cleaning apparatus comprising:
    a cleaning unit, provided with a cleaning member for performing a cleaning, configured to perform a wipe-off cleaning in a state where the cleaning member is in contact with the detection surface;
    a drive unit configured to press the cleaning member onto the detection surface;
    a detection unit configured to detect a force with which the cleaning member presses the detection surface; and
    a control unit configured to, while controlling the drive unit based on a result of the force detection by the detection unit to control the force, drive the cleaning unit to perform the wipe-off cleaning,
    wherein the control unit controls the force in the wipe-off cleaning with reference to past control information, and in a case where a detection device to be cleaned is determined to be a detection device of a type corresponding to the control information, the control unit controls the force with reference to the control information.

2. The cleaning apparatus according to claim 1, further comprising: a second drive unit to which the cleaning unit is attached, and configured to drive the cleaning member to face the detection surface, and approach and retreat from the detection surface.

3. The cleaning apparatus according to claim 1, wherein the control unit stores, in a memory, control information used to control the force in the wipe-off cleaning.

4. The cleaning apparatus according to claim 1, wherein the control unit performs control, in a case where the detection unit detects a force exceeding a threshold value, to reduce the force and then controls the cleaning unit to clean, with the reduced force, a position once cleaned with the force.

5. A method for controlling a cleaning apparatus that cleans a detection device having a detection surface, the method comprising:
    performing a wipe-off cleaning by using a cleaning unit, provided with a cleaning member for performing a cleaning, configured to perform a wipe-off cleaning in a state where the cleaning member is in contact with the detection surface;
    detecting a force with which the cleaning member presses the detection surface, and,
    controlling the force by controlling a drive unit based on a result of the detected force, to cause the cleaning unit to perform the wipe-off cleaning,
    wherein the force in the wipe-off cleaning is controlled with reference to past control information, and in a case where a detection device to be cleaned is determined to be a detection device of a type corresponding to the control information, the the force is controlled with reference to the control information.

6. A non-transitory computer-readable recording medium storing a program for causing a computer to function as a cleaning apparatus, the cleaning apparatus comprising:
    a cleaning unit, provided with a cleaning member for performing a cleaning, configured to perform a wipe-off cleaning in a state where the cleaning member is in contact with the detection surface;
    a drive unit configured to press the cleaning member onto the detection surface;
    a detection unit configured to detect a force with which the cleaning member presses the detection surface; and
    a control unit configured to, while controlling the drive unit based on a result of the force detection by the detection unit to control the force, drive the cleaning unit to perform the wipe-off cleaning,
    wherein the control unit controls the force in the wipe-off cleaning with reference to past control information, and in a case where a detection device to be cleaned is determined to be a detection device of a type corresponding to the control information, the control unit controls the force with reference to the control information.

7. A cleaning apparatus that cleans a detection device having a detection surface, the cleaning apparatus comprising:
    a cleaning unit, provided with a cleaning member for performing a cleaning, configured to perform a wipe-off cleaning in a state where the cleaning member is in contact with the detection surface;
    a drive unit configured to press the cleaning member onto the detection surface;
    a detection unit configured to detect a force with which the cleaning member presses the detection surface; and
    a control unit configured to, while controlling the drive unit based on a result of the force detection by the detection unit to control the force, drive the cleaning unit to perform the wipe-off cleaning,
    wherein the control unit performs control, in a case where the detection unit detects a force exceeding a threshold value, to reduce the force and then controls the cleaning unit to clean, with the reduced force, a position once cleaned with the force.

* * * * *